C. Pratt,
Soldering Mach.

No. 87,704.   Patented Mar. 9, 1869.

Witnesses:
Chas Nida
A. v. Briesen

Inventors:
Chas. Pratt
Conrad Saurel
Munn & Co.
Attorneys.

UNITED STATES PATENT OFFICE.

CHARLES PRATT, OF NEW YORK, AND CONRAD SEIMEL, OF GREEN POINT, N. Y., ASSIGNORS TO CHARLES PRATT.

IMPROVEMENT IN SOLDERING-MACHINE.

Specification forming part of Letters Patent No. 87,704, dated March 9, 1869.

*To all whom it may concern:*

Be it known that we, CHARLES PRATT, of the city, county, and State of New York, and CONRAD SEIMEL, of Green Point, Kings county, New York, have invented a new and useful Improvement in Soldering Apparatus; and we do hereby declare that the following is a full, clear, and exact description thereof, which will enable others skilled in the art to make and use the same, reference being had to the accompanying drawings, forming part of this specification.

This invention relates to a new apparatus for soldering sheet-metal cans at their top and bottom joints or seams, so that they can be immersed in solder to any depth.

The invention consists in the application of a metal sheet or box, which floats on the molten solder and sustains the can to be soldered, allowing it to be immersed to the requisite extent, and protecting the bottom of the can during the soldering process.

Figure 1:
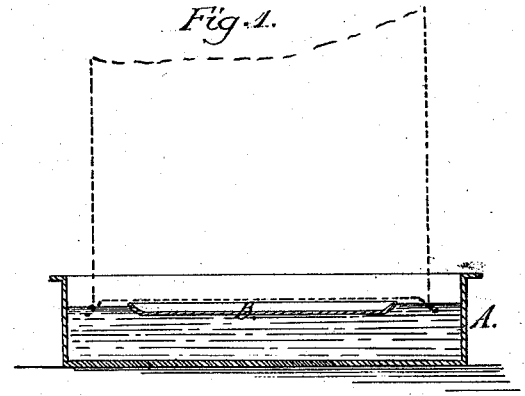
Figure 2:
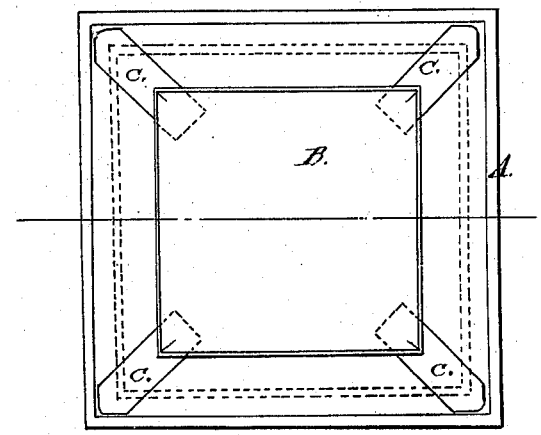

Figure 1 represents a longitudinal sectional elevation of our improved soldering apparatus, with a can shown therein in the position for soldering the seams at the bottom. Fig. 2 represents a plan view of the same.

Similar letters of reference indicate corresponding parts.

B in the drawing represents a metal sheet or box of suitable form, according to the shape of the can to be soldered. It is of such size that it will be within the flanges of the can when the same is placed upon it, as indicated in Fig. 1.

The edges of the sheet or box may be turned up, as shown, to more completely protect the bottom of the can.

The sheet or box B is to be placed directly upon the molten solder, that is contained in a suitable pan, A, so as to float thereon, and so that it will, when a can is placed upon it, sustain such can and guide it while it is being dipped in the solder. By slight pressure applied to the can it will be immersed to the requisite extent in the solder. The sheet or box, while acting as a float, will protect the bottom of the can.

As the molten solder is very heavy and buoyant, the area of the float may be considerably smaller than that of the cans to be soldered, and yet possess capacity to float the cans. They are adapted to cans of various sizes, and we avoid thereby the necessity of providing an apparatus for each special size of cans.

Projections C C may be formed on the sides of such floating sheet or box B, to regulate its position in the pan, so that it may not be deranged by being inclined. It is important that it should always remain as near as possible in a horizontal plane, so that the solder will be applied at an equal height to each side of the can.

The projections or guards C extend from the edges of the float B sufficiently far to touch the edge of the soldering-pan A, thus keeping the float in a central position within the pan, and permitting it to move freely up and down therein.

While a can is being soldered it should be held or guided at its upper part by the operator to retain it in the proper position.

Having thus described our invention, what we claim as new, and desire to secure by Letters Patent, is—

The float B, with or without the guides C, in combination with the soldering-pan A, substantially as described for the purpose specified.

The above specification of our invention signed by us this 13th day of February, 1869.

CHAS. PRATT.
CONRAD SEIMEL.

Witnesses:
A. V. BRIESEN,
E. GREENE COLLINS.